United States Patent
Nakahata et al.

(10) Patent No.: US 6,284,690 B1
(45) Date of Patent: Sep. 4, 2001

(54) $SI_3N_4$ CERAMIC, SI-BASE COMPOSITION FOR PRODUCTION THEREOF AND PROCESSES FOR PRODUCING THESE

(75) Inventors: Seiji Nakahata; Akira Yamakawa, both of Itami (JP)

(73) Assignee: Sumitomo Electric Industries, Ltd. (JP)

( * ) Notice: Subject to any disclaimer, the term of this patent is extended or adjusted under 35 U.S.C. 154(b) by 0 days.

(21) Appl. No.: 08/708,933

(22) Filed: Sep. 6, 1996

(30) Foreign Application Priority Data

Nov. 16, 1995 (JP) .................................................... 7-298004

(51) Int. Cl.[7] .................................................. C04B 35/591
(52) U.S. Cl. ........................ 501/97.1; 501/97.2; 501/97.3
(58) Field of Search ............................... 501/97, 98, 97.1, 501/97.2, 97.3

(56) References Cited

U.S. PATENT DOCUMENTS

| 4,943,401 | * | 7/1990 | Edler et al. | 501/97 |
| 5,055,432 | * | 10/1991 | Edler et al. | 501/97 |
| 5,387,562 | * | 2/1995 | Dillinger et al. | 501/97 |

FOREIGN PATENT DOCUMENTS

| 1212279 | 8/1989 | (JP) . |
| 3261662 | 11/1991 | (JP) . |
| WOX9105203 | 7/1991 | (WO) . |

OTHER PUBLICATIONS

Copy of Haggerty et al Article "Processing . . . Powders" pp. 51 to 61 (1986).

* cited by examiner

*Primary Examiner*—Karl Group
(74) *Attorney, Agent, or Firm*—Bierman, Muserlian and Lucas

(57) ABSTRACT

A slurry Si-base composition comprising an Si powder having a thickness of a surface oxide film ranging from 1.5 to 15 nm, 50 to 90% by weight of water, 0.2 to 7.5% by weight, in terms of oxide, of a sintering aid and 0.05 to 3% by weight of a dispersant, the Si-base composition having a pH value adjusted to 8–12. This slurry Si-base composition is produced by a process which comprises subjecting Si powder to oxidation treatment at 200 to 800° C. in air, adding 50 to 90% by weight of water, 0.2 to 7.5% by weight, in terms of oxide, of a sintering aid and 0.05 to 3% by weight of a dispersant to the oxidized Si powder and performing such a pH adjustment that the resultant mixture has a pH value of 8 to 12. The slurry Si-base composition not only enables producing a ceramic of $Si_3N_4$ at a lowered cost without the need to install explosionproof facilities but also allows the obtained $Si_3N_4$ ceramic having a relative density of at least 96% and a flexural strength of at least 800 MPa can be obtained.

14 Claims, 2 Drawing Sheets

$Si_3N_4$ CERAMIC, SI-BASE COMPOSITION FOR PRODUCTION THEREOF AND PROCESSES FOR PRODUCING THESE

BACKGROUND OF THE INVENTION

1. Field of the Invention

The present invention relates to a slurry Si-base composition for use in producing an $Si_3N_4$ ceramic, which composition contains water as a dispersion medium. Also, the present invention relates to a dense $Si_3N_4$ ceramic of a high strength produced from the above slurry Si-base composition and processes for producing these.

2. Description of the Prior Art

Alcohols have been employed as a dispersion medium for ensuring an effective dispersion of a silicon (Si) powder in the mixing/molding step when a ceramic is produced from the silicon powder as a starting material, as described in Mat. Res. Soc. Symp. Proc., vol. 60, pp. 51–61 (1986). However, from the industrial point of view, the process in which use is made of an alcohol must be provided with expensive explosionproof facilities, which constitute a cause of the increase of product cost.

On the other hand, Japanese Patent Laid-Open Nos. 261662/1991 and 212279/1989 proposed processes in which water not requiring explosionproof facilities is used as a dispersion medium. These processes produce a sintered body of $Si_3N_4$ through dispersion of an Si powder in water, addition of an organic binder, a nitriding agent, etc. so as to obtain a slurry, dehydration of the slurry, molding and heating for sintering the molding.

However, the above processes described in Japanese Patent Laid-Open Nos. 261662/1991 and 212279/1989 fail to add a sintering aid required for densification of the resulting sintered body. Therefore, for example, as clearly set forth in Japanese Patent Laid-Open No. 261662/1991, the obtained sintered body of $Si_3N_4$ cannot help having a multiplicity of minute pores dispersed therein. Consequently, the flexural strength of the sintered body of $Si_3N_4$ is anticipated to be very low. Actually, only a flexural strength as low as 600 MPa or less has been realized.

The reason for the failure to add a sintering aid to the water-base slurry in the above conventional processes would be that the dispersion of Si powder and sintering aid is poor in water as different from that in an alcohol, thereby causing the resultant specimen to have a nonuniform density therein.

SUMMARY OF THE INVENTION

In view of the above circumstances to now, objects of the present invention are to provide a slurry Si-base composition for production of a ceramic of $Si_3N_4$ which uses water as a dispersion medium and contains a sintering aid by improving the dispersion of powder in water and further to provide an inexpensive dense $Si_3N_4$ ceramic of a high strength which is produced from the above Si-base composition.

The slurry Si-base composition provided by the present invention for attaining the above objects comprises an Si powder having a thickness of a surface oxide film ranging from 1.5 to 15 nm, 50 to 90% by weight of water, 0.2 to 7.5% by weight, in terms of oxide, of a sintering aid and 0.05 to 3% by weight of a dispersant, the Si-base composition having a pH value adjusted to 8–12.

This slurry Si-base composition is produced by a process which comprises subjecting Si powder to oxidation treatment at 200 to 800° C. in air, adding 50 to 90% by weight of water, 0.2 to 7.5% by weight, in terms of oxide, of a sintering aid and 0.05 to 3% by weight of a dispersant to the Si powder and performing such a pH adjustment that the resultant mixture has a pH value of 8 to 12.

Further, the use of the above slurry Si-base composition not only enables producing a ceramic of $Si_3N_4$ at a lowered cost without the need to install explosionproof facilities but also allows the obtained $Si_3N_4$ ceramic to be dense, uniform and highly strong. Specifically, an $Si_3N_4$ ceramic having a relative density of at least 96% and a flexural strength of at least 800 MPa can be obtained.

DETAILED DESCRIPTION OF THE PREFERRED EMBODIMENTS

Figure 1:
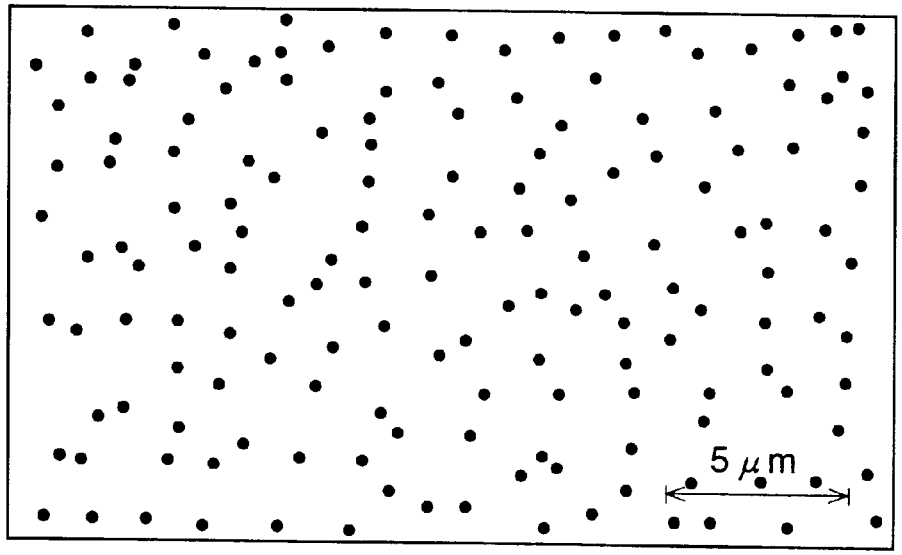
FIG. 1 is a constitutional diagram of the texture of an $Si_3N_4$ ceramic of the present invention as observed by EPMA, in which Y and Sm as the sintering aid are dotted.

In the present invention, the dispersion of Si powder and sintering aid in water has been improved by treating the surface of the Si powder, regulating the amount of water as a dispersion medium, adjusting the pH value of the slurry and applying a dispersant, preferably, adding an organic binder, thereby enabling the step of water mixing and molding. Accordingly, the slurry Si-base composition of the present invention can be handled without the need to install explosionproof facilities, so that an inexpensive $Si_3N_4$ ceramic can be provided.

The Si powder for use in the present invention is obtained by subjecting a commercially available Si powder to oxidation treatment in air at 200 to 800° C. to thereby form an oxide film having a thickness as large as 1.5 to 15 nm at the surface of the Si powder. Although the thickness of the oxide film present at the surface of the commercially available Si powder generally ranges from 0.3 to 1.0 nm, the oxidation treatment thereof in air at 200 to 800° C. enables regulating the thickness of the oxide film so as to range from 1.5 to 15 nm. The above thickness of the oxide film is a value estimated from the results of measurement of the oxygen content and specific surface area of the powder.

This oxidation treatment enables enhancing the dispersibility of Si powder. Although the reason for the dispersibility enhancement has not yet been elucidated, it can be presumed as follows. The surface of customary commercially available Si powder is composed of SiO and has a high content of Si of poor water wettability. The foregoing oxidation treatment increases the content of oxygen, which is a component of water, so that SiO is converted to $SiO_2$. As a result, the water wettability of the Si powder is enhanced to thereby cause each Si powder aggregate to loosen into separate particles with the result that the Si powder dispersibility is enhanced. Further, the dispersibility enhancement can partly be attributed to that, even if the surface oxide film is partially peeled by mutual powder contacts at the time of mixing, the thickness of the oxide film is so large that Si of poor water wettability is scarcely exposed at the surface of the Si powder.

When the treating temperature is lower than 200° C. in the oxidation treatment of the Si powder, satisfactory surface oxidation treatment cannot be performed, so that powder particles aggregate with each other to thereby disenable uniform mixing thereof with a subsequently added sintering aid. Thus, after sintering, the sintered body suffers from density dispersion, so that the obtained $Si_3N_4$ ceramic has poor strength without exception. On the other hand, when the oxidation treatment is conducted at temperatures higher than 800° C., $SiO_2$ is formed in high proportion at the surface of the silicon powder, so that a large amount of the $SiO_2$ remains in the ceramic as impurities in the grain boundary phase. Thus, also, the obtained $Si_3N_4$ ceramic has poor strength without exception.

It is preferred that the average particle size of the Si powder ranges from 0.1 to 10 μm. The reason is that a powder having an average particle size of less than 0.1 μm has such a high bulk density that handling thereof is difficult and that, on the other hand, it is difficult to bring powder having an average particle size exceeding 10 μm into a uniform slurry because of the occurrence of aggregation and precipitation.

Although the sintering aid for use in the present invention can be any of those having commonly been employed in the sintering of $Si_3N_4$, it is preferred to use at least one selected from among compounds of Group IIa elements, Group IIIa elements and rare earth elements of the periodic table and especially preferred to use at least one of compounds of Ca, Sr, Mg, Al, Y, La, Sm, Nd and Yb. In particular; it is most especially preferred to use at least one member selected from among oxides, nitrides and oxynitrides of Ca, Mg, Al, Y, La and Sm, which are available at relatively low costs, and composite compounds thereof. Powder of at least one of the above compounds can be added as the sintering aid. Alternatively, use can be made of precursors which are converted to the above oxides, nitrides and oxynitrides at up to 1500° C. by heating, for example, calcium laurate and yttrium stearate.

The sintering aid is added in an amount of 0.2 to 7.5% by weight in term of oxide based on the entirety of the slurry composition (0.5 to 17% by weight in terms of oxide based on Si powder). When the amount of sintering aid is smaller than 0.2% by weight based on the entirety of the composition, the function of the sintering aid cannot be fulfilled and the relative density of the obtained sintered body is lower than 96% with a multiplicity of pores present therein with the result that only a low flexural strength can be realized. On the other hand, when it exceeds 7.5% by weight, the proportion of the grain boundary phase of a low strength is unfavorably increased in the sintered body to thereby cause the strength of the obtained $Si_3N_4$ ceramic to be low.

Especially preferred dispersants are those of ammonium polycarboxylate. The dispersant is added in an amount of 0.05 to 3% by weight (0.5 to 5% by weight based on Si powder), preferably, 0.05 to 2.5% by weight based on the entirety of the slurry composition. The addition of the dispersant improves the dispersion of powder and eliminates powder aggregation, so that, upon molding, the density dispersion is less in the molded body. Thus, the obtained molded body has a high relative density and ensures an excellent handleability. When the amount of dispersant is smaller than 0.05% by weight, the function of the dispersant cannot be fulfilled. Although the molded body has no density change even when the addition of the dispersant exceeds 2.5% by weight, the addition in an amount of more than 3% by weight unfavorably causes the dispersant to remain in the sintered body obtained by heating as impurities, so that the strength of the sintered body is lowered.

An extremely uniform slurry Si-base composition in which the dispersion of powder has markedly been improved can be obtained by mixing together the above Si powder, sintering aid, dispersant and water, performing such a regulation that the proportion of water in the slurry becomes 50 to 90% by weight and adjusting the pH value of the slurry to 8–12 with the use of an alkaline solution such as ammonia.

When the proportion of water is less than 50% by weight in the above regulation, the viscosity of the slurry is increased to such an extent that the Si powder and the sintering aid powder cannot be uniformly mixed with each other. On the other hand, when the proportion of water exceeds 90% by weight, only a molded body of a low density can be obtained in the step of preparing a molded body from the slurry, so that the handleability of the molded body is deteriorated. Moreover, when the pH value of the slurry is smaller than 8 or larger than 12, powder aggregation would occur.

The process for producing an $Si_3N_4$ ceramic from the thus obtained slurry Si-base composition comprises satisfactorily mixing the slurry by means of, for example, a ball mill, molding and heating the molded body in an atmosphere of nitrogen to thereby sinter the same.

When in advance an organic binder, for example, an acrylic one is added to the slurry and mixed, molding can be conducted while removing water from the slurry under pressure. The organic binder is added in the same amount as the dispersant, namely, ranging from 0.05 to 3% by weight, preferably, from 0.05 to 2.5% by weight. The reason is the same as in the dispersant. On the other hand, when no organic binder is added to the slurry, the slurry is dried by the use of, for example, a freeze dryer or a spray dryer, an organic binder is sprayed over the resultant dry powder and a dry press molding thereof is performed.

The organic binder is removed from the molded body obtained through the above process and the resultant molded body is heated to thereby sinter the same. Thus, an $Si_3N_4$ ceramic is obtained. An EPMA (Electron Probe Micro Analysis) observation of the obtained $Si_3N_4$ ceramic showed that a texture was realized in which the sintering aid (dotted in the figure) was uniformly dispersed as shown in FIG. 1.

Figure 2:
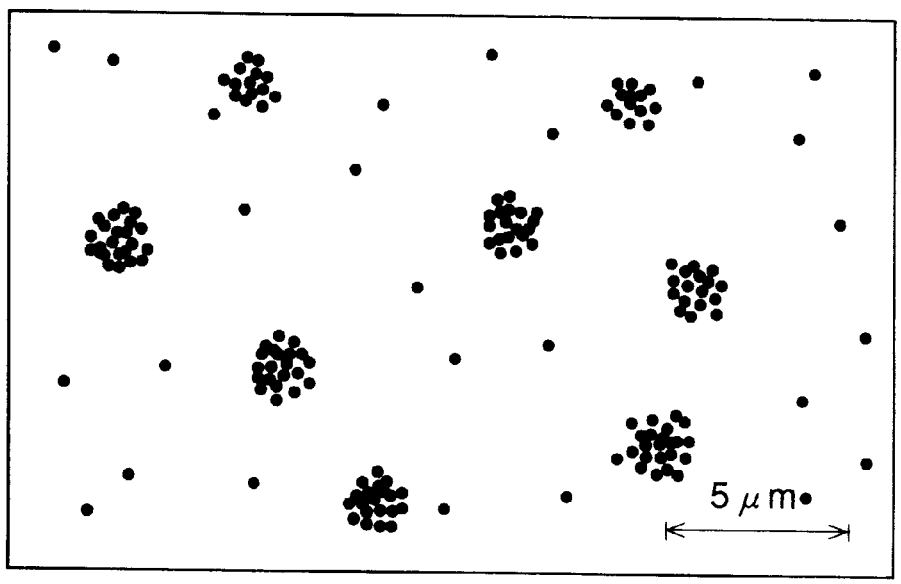
FIG. 2 is a constitutional diagram of the texture of an $Si_3N_4$ ceramic produced from a slurry of commercially available Si powder of which no oxidation treatment was effected as observed by EPMA, in which also Y and Sm as the sintering aid are dotted.
Figure 3:
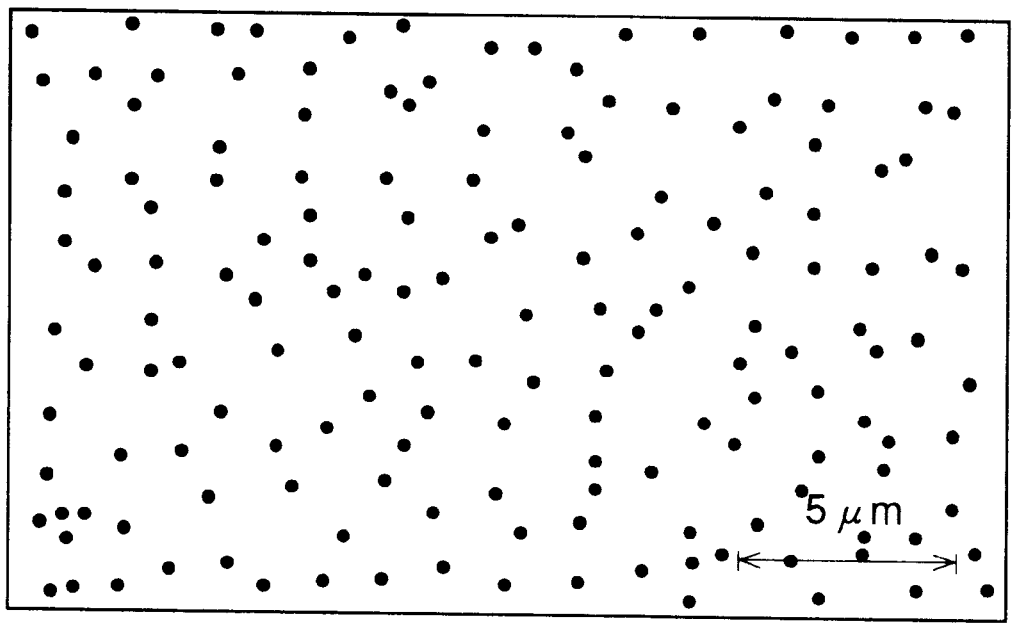
FIG. 3 is a constitutional diagram of the texture of an $Si_3N_4$ ceramic produced from a prior art slurry in which use was made of an alcohol as observed by EPMA, in which also Y and Sm as the sintering aid are dotted.

For reference, FIG. 2 shows the texture of the $Si_3N_4$ ceramic produced from a commercially available Si powder of which no oxidation treatment was carried out and FIG. 3 shows the texture of the $Si_3N_4$ ceramic obtained by the conventional process using an alcohol. It is found by comparison of the dispersions of sintering aid that the sintering aid is dispersed in FIG. 1 according to the present invention with the same uniformity as in FIG. 3 according to the prior art using an alcohol while the sintering aid particles are aggregated with each other in FIG. 2 showing the dispersion exhibited when use is made of the commercially available Si powder.

The thus obtained $Si_3N_4$ ceramic of the present invention is uniform as mentioned above and rendered dense so as to have a relative density of at least 96%. Further, a three-point flexural strength test conducted in accordance with Japanese Industrial Standard R-1601 showed that the $Si_3N_4$ ceramic had a strength as high as at least 800 MPa. It is seen that this flexural strength is very high because the highest flexural strength of the ceramic obtained by the conventional water mixing process described in, for example, the above Japanese Patent Laid-Open No. 261662/1991 is only about 600 MPa.

Moreover, the dispersion medium is water and no alcohol is used in the process of the present invention. Therefore, the process of the present invention enables using an inexpensive production line requiring no explosionproof facilities and hence providing an inexpensive $Si_3N_4$ ceramic product of a high quality.

EXAMPLE 1

A commercially available Si powder of 2.8 μm in an average particle size was subjected to oxidation treatment in air at each of the temperatures specified in Table 1 for 5 hr. The thickness of the oxide film formed at the surface of each of the obtained sample Si powders is also given in Table 1. Water, $Y_2O_3$ powder and $Sm_2O_3$ powder as a sintering aid and an ammonium polycarboxylate dispersant were added to each Si powder so that their respective amounts were 70% by weight, 2% by weight, 3% by weight and 0.5% by weight based on the entirety of the resultant slurry.

Subsequently, the pH value of each of the above mixtures was adjusted to 8.5 with ammonia and the mixtures were individually mixed by means of a ball mill for 48 hr, thereby obtaining a slurry. With respect to sample 2, an acrylic organic binder was added to the slurry in an amount of 0.5% by weight and a molded body was prepared while removing water from the slurry under pressure. With respect to the other samples, an acrylic organic binder was sprayed while each slurry obtained in the above manner was dried by means of a spray dryer to thereby effect granulation and a molded body was obtained.

Thereafter, each of the above molded bodies was heated at 800° C. in an atmosphere of nitrogen to thereby remove the organic binder and the temperature was raised to 1800° C. in the nitrogen atmosphere. At that temperature, the heating was continued for 4 hr, thereby obtaining each sintered body of $Si_3N_4$. With respect to the elements of the sintering aid which were present in each of the sintered bodies of $Si_3N_4$, Y was 4.4% by weight and Sm 6.7% by weight.

The relative density of each of the obtained sintered bodies of $Si_3N_4$ and each of the molded bodies obtained in the same manner as described above was measured by the method of Archimedes. Further, the flexural strength of each of the sintered bodies was measured by the three-point flexural test complying with Japanese Industrial Standard R-1601. The obtained results are collectively given in Table 1.

TABLE 1

| Sample | Oxidation treatment (° C. × hr) | Thickness of oxide film (nm) | Relative density(%) | | Flexural strength (MPa) |
|---|---|---|---|---|---|
| | | | molded body | sintered body | |
| 1 | 200 × 5 | 1.5 | 53 | 96 | 960 |
| 2 | 600 × 5 | 5.3 | 56 | 98 | 960 |
| 3 | 800 × 5 | 14.6 | 53 | 96 | 820 |
| 4* | none | 0.5 | 50 | 92 | 430 |
| 5* | 900 × 5 | 15.5 | 53 | 95 | 480 |

(Note) Samples asterisked in the table are comparative ones.

As apparent from the above results, with respect to each of the samples of the present invention, the treatment of Si powder at 200 to 800° C. enabled regulating the thickness of the oxide film at the powder surface to 1.5–15 nm, so that the molded body and sintered body were uniform and had desirable relative densities and that the sintered body of $Si_3N_4$ having a flexural strength of at least 800 MPa was obtained.

In contrast, with respect to sample 4 from the Si powder of which no oxidation treatment was carried out, powder particles aggregated with each other to thereby disenable obtaining a uniform molded body and to render its relative density as low as 50%. Although sintering was conducted under the same conditions, the obtained sintered body had relative density and flexural strength which were both low. Further, with respect to sample 5 from the Si powder subjected to oxidation treatment at 900° C., a large amount of oxide originating in the oxide film was present at grain boundaries of the sintered body, so that its flexural strength was poor.

EXAMPLE 2

Sintered bodies of $Si_3N_4$ were obtained in the same manner as in Example 1, except that the proportion of water as a dispersion medium of the slurry was varied as specified in Table 2 below. The employed Si powder was the same as sample 2 of Example 1, which was obtained by subjecting commercially available Si powder to oxidation treatment at 600° C. in air for 5 hr and had an oxide film of 5.3 nm in thickness.

The type and amount of employed sintering aid were the same as in Example 1. Thus, with respect to the elements of the sintering aid which were present in each of the obtained sintered bodies of $Si_3N_4$, Y was 4.4% by weight and Sm 6.7% by weight. Further, the pH value of the slurry and the dispersant for use therein were also the same as in Example 1. With respect to sample 8, 0.5% by weight of the organic binder was added to the slurry and, with respect to the other samples, the organic binder was sprayed over dry powder and molding was conducted.

The relative density and flexural strength of each of the obtained sintered bodies of $Si_3N_4$ were measured in the same manner as in Example 1 and given in Table 2 along with the relative density of each of the molded bodies which was measured in the same manner.

TABLE 2

| Sample | Amount of water added (wt.%) | Relative density (%) | | Flexural strength (MPa) |
|---|---|---|---|---|
| | | molded body | sintered body | |
| 6 | 50 | 53 | 96 | 850 |
| 7 | 80 | 54 | 97 | 950 |
| 8 | 90 | 56 | 98 | 950 |
| 9* | 45 | 49 | 87 | 350 |
| 10* | 95 | 48 | 87 | 380 |

(Note) Samples asterisked in the table are comparative ones.

As apparent from the above results, the regulation of the proportion of water to the slurry to 50–90% by weight enables obtaining a molded body of desired density and the sintering thereof enables producing a sintered body having a flexural strength of at least 800 MPa.

EXAMPLE 3

Sintered bodies of $Si_3N_4$ were obtained in the same manner as in Example 1, except that the type and amount of added sintering aid were varied as specified in Table 3 below. The employed Si powder was the same as sample 2 of Example 1, which was obtained by subjecting the commercially available Si powder to oxidation treatment at 600° C. in air for 5 hr and had an oxide film of 5.3 nm in thickness.

The sintering aid was added in the form of oxides in sample Nos. 11–13, 18, 19 and 21, a nitride in sample No.

14, oxynitrides in sample Nos. 15 and 20, lauric acid in sample No. 16 and stearic acid in sample No. 17. The amount of sintering aid added was expressed in terms of oxide without exception. The proportion of water, slurry pH and dispersant were the same as in Example 1. With respect to sample Nos. 16 to 19, 0.5% by weight of organic binder was added to the slurry and, with respect to the other samples, the organic binder was sprayed over dry powder and molding was performed.

Not only the relative density and flexural strength of each of the obtained sintered bodies of $Si_3N_4$ but also the relative density of each of the molded bodies and the contents of sintering aid elements in each of the sintered bodies were measured in the same manner as in Example 1 and given in Table 3.

TABLE 3

| Sample | Sintering aid (wt.%) | | Sintering aid element in sintered body (wt.%) | | Relative density (%) molded body | Relative density (%) sintered body | Flexural strength (MPa) |
|---|---|---|---|---|---|---|---|
| 11 | Sm(0.15) | Ca(0.1) | Sm(0.33) | Ca(0.22) | 54 | 96 | 820 |
| 12 | Sm(0.3) | Y(0.2) | Sm(0.67) | Y(0.44) | 54 | 96 | 880 |
| 13 | Sm(0.5) | La(0.5) | Sm(1.1) | La(1.1) | 53 | 96 | 920 |
| 14 | Sm(1.5) | Nd(1.5) | Sm(3.3) | Nd(3.3) | 54 | 97 | 840 |
| 15 | Sm(2.0) | Yb(2.0) | Sm(4.4) | Yb(4.4) | 54 | 97 | 1080 |
| 16 | Yb(4.0) | Al(2.0) | Yb(8.9) | Al(4.4) | 57 | 98 | 980 |
| 17 | La(5.0) | Sr(2.0) | La(11.1) | Sr(4.4) | 57 | 98 | 1020 |
| 18 | Sm(5.0) | Mg(2.0) | Sm(11.1) | Mg(4.4) | 56 | 98 | 1250 |
| 19 | Sm(5.0) | Mg(2.3) | Sm(11.1) | Mg(5.8) | 55 | 97 | 1200 |
| 20* | Sm(0.1) | Ca(0.05) | Sm(0.2) | Ca(0.1) | 53 | 92 | 410 |
| 21* | Sm(5.0) | Y(3.0) | Sm(11.1) | Y(6.7) | 54 | 94 | 520 |

(Note) Samples asterisked in the table are comparative ones.

As apparent from the above results, the addition of the Group IIa, Group IIIa and/or rare earth elements as the sintering aid in an amount of 0.2 to 7.5% by weight in terms of oxide enables obtaining a sintered body of $Si_3N_4$ having a relative density of at least 96% and a flexural strength of at least 800 MPa.

EXAMPLE 4

Sintered bodies of $Si_3N_4$ were obtained in the same manner as in Example 1, except that the pH value of slurry was varied as specified in Table 4 below.

The employed Si powder was the same as sample 2 of Example 1, which was obtained by subjecting commercially available Si powder to oxidation treatment at 600° C. in air for 5 hr and had an oxide film of 5.3 nm in thickness.

The employed sintering aid consisted of 2% by weight of $Y_2O_3$ and 3% by weight of $Sm_2O_3$ as in Example 1. Thus, with respect to the contents of sintering aid elements in each of the obtained sintered bodies, Y was 4.4% by weight and Sm 6.7% by weight. The proportion of water and the dispersant were also the same as in Example 1. Further, the organic binder was added by spraying the same over dry powder without exception.

The relative density and flexural strength of each of the obtained sintered bodies of $Si_3N_4$ were measured in the same manner as in Example 1 and given in Table 4 along with the relative density of each of the molded bodies which was measured in the same manner.

TABLE 4

| Sample | pH | Relative density (%) molded body | Relative density (%) sintered body | Flexural strength (MPa) |
|---|---|---|---|---|
| 22 | 8 | 53 | 96 | 820 |
| 23 | 10 | 53 | 96 | 850 |
| 24 | 12 | 53 | 96 | 825 |
| 25* | 75 | 48 | 92 | 390 |
| 26* | 13 | 49 | 91 | 410 |

(Note) Samples asterisked in the table are comparative ones.

As apparent from the above results, maintaining the pH value of the slurry at 8 to 12 enables obtaining a molded body of desired density and the sintering of the molded body enables obtaining a dense sintered body of $Si_3N_4$ having an flexural strength of at least 800 MPa.

EXAMPLE 5

Sintered bodies of $Si_3N_4$ were obtained in the same manner as in Example 1, except that the amounts of dispersant and organic binder were as specified in Table 5 below. The employed Si powder was the same as sample 2 of Example 1, which was obtained by subjecting commercially available Si powder to oxidation treatment at 600° C. in air for 5 hr and had an oxide film of 5.3 nm in thickness.

The organic binder was added by spraying the organic binder over powder obtained by drying the slurry with respect to sample Nos. 27 to 31 and by charging the organic binder into the slurry with respect to the other sample Nos. 32 to 37. The type and amount of added sintering aid were the same as in Example 1. Thus, with respect to the contents of sintering aid elements in each of the obtained sintered bodies of $Si_3N_4$, Y was 4.4% by weight and Sm 6.7% by weight. The proportion of water and the slurry pH were also the same as in Example 1.

The relative density and flexural strength of each of the obtained sintered bodies of $Si_3N_4$ were measured in the same manner as in Example 1 and given in Table 5 along with the relative density of each of the molded bodies which was measured in the same manner.

TABLE 5

| Sample | Dispersant (wt. %) | Binder (wt. %) | Relative density (%) molded body | Relative density (%) sintered body | Flexural strength (MPa) |
| --- | --- | --- | --- | --- | --- |
| 27 | 0.05 | sprayed | 53 | 96 | 850 |
| 28 | 2.5 | sprayed | 53 | 96 | 870 |
| 29 | 3.0 | sprayed | 52 | 96 | 810 |
| 30* | 0.03 | sprayed | 52 | 93 | 480 |
| 31* | 3.5 | sprayed | 52 | 93 | 470 |
| 32 | 0.5 | 0.05 | 55 | 97 | 1100 |
| 33 | 0.5 | 1.5 | 57 | 98 | 1210 |
| 34 | 0.5 | 2.5 | 57 | 98 | 1250 |
| 35 | 0.5 | 3.0 | 53 | 97 | 820 |
| 36* | 0.5 | 0.04 | 43 | 86 | 320 |
| 37* | 0.5 | 3.2 | 53 | 91 | 450 |

(Note) Samples asterisked in the table are comparative ones.

As apparent from the above results, maintaining each of the respective proportions of dispersant and organic binder to the slurry at 0.05 to 3% by weight enables directly obtaining a molded body of desired density from the slurry and the sintering of the molded body enables obtaining a dense sintered body of $Si_3N_4$ having a flexural strength of at least 800 MPa.

The slurry Si-base composition for use in the production of the $Si_3N_4$ ceramic which contains water as the dispersion medium and the sintering aid can be obtained by the present invention. The use of this silicon-base composition enables the powder mixing and molding without the need to install explosionproof facilities, so that inexpensive product can be provided. Moreover, the dense sintered body of a high strength can be produced through the molded body of a uniform density from the silicon-base composition adjusted to appropriate conditions. Thus, the high-quality $Si_3N_4$ ceramic whose relative density is at least 96% and whose flexural strength is at least 800 MPa can be provided by the present invention.

What is claimed is:

1. A slurry Si-base composition comprising Si powder having a thickness of a surface oxide film ranging from 1.5 to 15 nm, 50 to 90% by weight of water, 0.2 to 7.5% by weight, in terms of oxide, of a sintering aid and 0.05 to 3% by weight of a dispersant, said Si-base composition having a pH value adjusted to 8–12.

2. The Si-base composition according to claim 1, wherein the sintering aid is at least one selected from among compounds of Group IIa, Group IIIa and rare earth elements.

3. The Si-base composition according to claim 2, wherein the Group IIa, Group IIIa and rare earth elements are Ca, Sr, Mg, Al, Y, La, Sm, Nd and Yb.

4. The Si-base composition according to claim 2, wherein the compounds of the Group IIa, Group IIIa and rare earth elements are oxides, nitrides and oxynitrides or sintering aid precursors convertible by heating to the oxides, nitrides and oxynitrides.

5. The Si-base composition according to claim 3, wherein the compounds of the Group IIa, Group IIIa and rare earth elements are oxides, nitrides and oxynitrides or sintering aid precursors convertible by heating to the oxides, nitrides and oxynitrides.

6. The Si-base composition according to claim 1, which further comprises an organic binder.

7. The Si-base composition according to claim 6, wherein the organic binder is contained in an amount of 0.05 to 3% by weight.

8. A process for producing a slurry Si-base composition, which comprises subjecting an Si powder to oxidation treatment at 200 to 800° C. in air, adding 50 to 90% by weight of water, 0.2 to 7.5% by weight, in terms of oxide, of a sintering aid and 0.05 to 3% by weight of a dispersant to the Si powder and performing such a pH adjustment that the resultant mixture has a pH value of 8 to 12.

9. The process according to claim 8, wherein the sintering aid is at least one selected from among compounds of Group IIa, Group IIIa and rare earth elements.

10. The process according to claim 9, wherein the Group IIa, Group IIIa and rare earth elements are Ca, Sr, Mg, Al, Y, La, Sm, Nd and Yb.

11. The process according to claim 9, wherein the compounds of the Group IIa, Group IIIa and rare earth elements are powder of oxides, nitrides and oxynitrides or sintering aid precursors convertible by heating to the oxides, nitrides and oxynitrides.

12. The process according to claim 10, wherein the compounds of the Group IIa, Group IIIa and rare earth elements are powder of oxides, nitrides and oxynitrides or sintering aid precursors convertible by heating to the oxides, nitrides and oxynitrides.

13. The process according to claim 8, which further comprises adding an organic binder to the slurry Si-base composition.

14. The process according to claim 13, wherein the organic binder is added in an amount of 0.05 to 3% by weight.

* * * * *